United States Patent
De Roche

(10) Patent No.: US 7,231,997 B2
(45) Date of Patent: Jun. 19, 2007

(54) HYBRID DRIVE POWERED LIFT PLATFORM

(75) Inventor: Mark Stephen De Roche, Playa del Rey, CA (US)

(73) Assignee: Aerofex Corporation, Manhattan Beach, CA (US)

( * ) Notice: Subject to any disclaimer, the term of this patent is extended or adjusted under 35 U.S.C. 154(b) by 96 days.

(21) Appl. No.: 11/089,661

(22) Filed: Mar. 25, 2005

(65) Prior Publication Data

US 2006/0213710 A1   Sep. 28, 2006

(51) Int. Cl.
- *B60V 1/00* (2006.01)
- *B60V 1/11* (2006.01)
- *B64C 15/00* (2006.01)
- *B64C 27/00* (2006.01)

(52) U.S. Cl. ............ 180/116; 180/117; 244/12.1; 244/12.3; 244/15; 244/23 B; 244/17.11; 244/17.19; 244/17.21

(58) Field of Classification Search ............. 180/116, 180/117; 192/48.92; 244/12.1, 12.3, 23 B, 244/17.11, 17.19, 17.21; 416/90 A, 189
See application file for complete search history.

(56) References Cited

U.S. PATENT DOCUMENTS

| | | | | |
|---|---|---|---|---|
| 3,744,584 A | * | 7/1973 | Swift | 180/6.48 |
| 4,040,578 A | * | 8/1977 | Yuan | 244/17.19 |
| 4,989,406 A | * | 2/1991 | Vdoviak et al. | 60/762 |
| 5,562,414 A | * | 10/1996 | Azuma | 416/90 A |
| 5,890,441 A | * | 4/1999 | Swinson et al. | 244/12.3 |
| 6,513,752 B2 | * | 2/2003 | Carter, Jr. | 244/8 |
| 6,666,404 B1 | * | 12/2003 | Wingert et al. | 244/17.19 |
| 6,752,351 B2 | * | 6/2004 | John | 244/3.22 |
| 6,843,447 B2 | * | 1/2005 | Morgan | 244/12.3 |
| 6,848,650 B2 | * | 2/2005 | Hoisignton et al. | 244/13 |

OTHER PUBLICATIONS

N.J. Wood et al., Circulation Control Airfoils as Applied to Rotary-Wing Aircraft, J. Aircraft, Dec. 1, 1986, pp. 865-875, vol. 23, No. 12, Publisher: American Institute of Aeronautics and Astronautics, Published in: US.

Rafi Yoeli, Ducted Fan Utility Vehicles and Other Flying Cars, Nov. 6, 2002, pp. 1-4, Publisher: American Institute of Aeronautics and Astronautics, Published in: US.

R.J. Weir, Aerodynamic Design Considerations for a Free-Flying Ducted Propeller, AIAA Atmospheric Flight Mechanics Conference, Aug. 15, 1988-Aug. 17, 1988, pp. 420-431, Technical Papers A88-50576 21-01, American Institute of Aeronautics and Astronautics, Washington, D.C.

* cited by examiner

*Primary Examiner*—Lesley D. Morris
*Assistant Examiner*—Marc A. Scharich
(74) *Attorney, Agent, or Firm*—Patent Law Office of David Beck

(57) ABSTRACT

An air-based thrust recovery system for use in a powered lift platform utilizing fixed-pitch propellers is provided. The system utilizes an air compressor coupled to the drive motor of the platform and an on-board, high pressure tank for air storage. The fixed-pitch propellers are coupled to the primary drive system with over-running clutches, thus allowing the thrust recovery system to rotate the propellers faster than if driven solely by the primary drive system. Preferably the propellers are surrounded by air ducts. The thrust recovery system uses individually, or in combination, cold air jets mounted at the tips of the propellers, a circulation control system which blows out the leading or trailing edge of the propellers, and one or more perforated tubing segments surrounding at least a portion of the platform's air ducts.

21 Claims, 7 Drawing Sheets

HYBRID DRIVE POWERED LIFT PLATFORM

FIELD OF THE INVENTION

The present invention relates generally to powered lift platforms and, more particularly, to an apparatus for augmenting the lift capabilities of the primary drive system in a dual propeller platform.

BACKGROUND OF THE INVENTION

A variety of propeller based lift platforms have been designed over the years which use two or more propellers coupled to a single engine. Typically the propellers are ducted, thus increasing propeller efficiency, decreasing noise and eliminating the dangers associated with exposed blades.

In general, ducted propeller platforms do not possess autorotation capabilities. In order to achieve at least a level of fail-safe operation, such platforms often employ redundant engines thus allowing the platform to overcome the failure of a single engine. Unfortunately as such an approach does not provide complete system redundancy, the failure of any of a variety of other components within the drive system will still lead to the catastrophic failure of the platform.

A typical ducted platform uses fixed-pitch propellers, thus simplifying the overall design. As a result, however, such a platform must use an internal combustion engine since turbine engines, although more efficient, suffer from spin-up lag. Although the inherent lag in turbines can be overcome using variable-pitch propellers, this defeats the mechanical simplicity and the weight savings offered by the used of fixed-pitch propellers.

Another issue confronting ducted propellers is their susceptibility to upsets due to sudden wind gusts.

Although a variety of fixed-pitch propeller platforms have been designed, these platforms typically require the use of internal combustion engines, provide limited fail-safe operation, and are susceptible to wind gusts. The present invention overcomes these limitations.

SUMMARY OF THE INVENTION

The present invention provides a thrust recovery system for use in a powered lift platform utilizing fixed-pitch propellers. The thrust recovery system of the invention is a compressed air-based system which enhances the lift characteristics of the platform with minimal weight penalties. The system utilizes an air compressor coupled to the drive motor of the platform and an on-board, high pressure tank for air storage. The fixed-pitch propellers are coupled to the primary drive system with over-running clutches, thus allowing the thrust recovery system to rotate the propellers faster than if driven solely by the primary drive system. Preferably the propellers are surrounded by air ducts.

In one embodiment of the invention, the thrust recovery system uses cold air jets mounted at the tips of the propellers, i.e., tip jets, to rotate the propellers. The tip jets on each propeller can be under the control of a single valve, thus providing an extremely simple design, or under the control of multiple independent valves, thus providing a means of achieving single axis attitude control. In addition to the tip jets, the air-based system can be coupled to a circulation control system comprised of a plurality of holes within either the trailing edge or the leading edge of the propeller blades, thus providing a means of increasing the coefficient of lift. As with the tip jets, valves can be used to allow either simultaneous control, or independent control, of the circulation control system contained within each propeller. Alternately, or in addition to the tip jets and the circulation control system, the air tank of the thrust recovery system can be coupled to one or more perforated tubing segments surrounding at least a portion of the platform's air ducts, thereby providing a means of overcoming the effects of sudden wind gusts.

A further understanding of the nature and advantages of the present invention may be realized by reference to the remaining portions of the specification and the drawings.

DESCRIPTION OF THE SPECIFIC EMBODIMENTS

Figure 1:
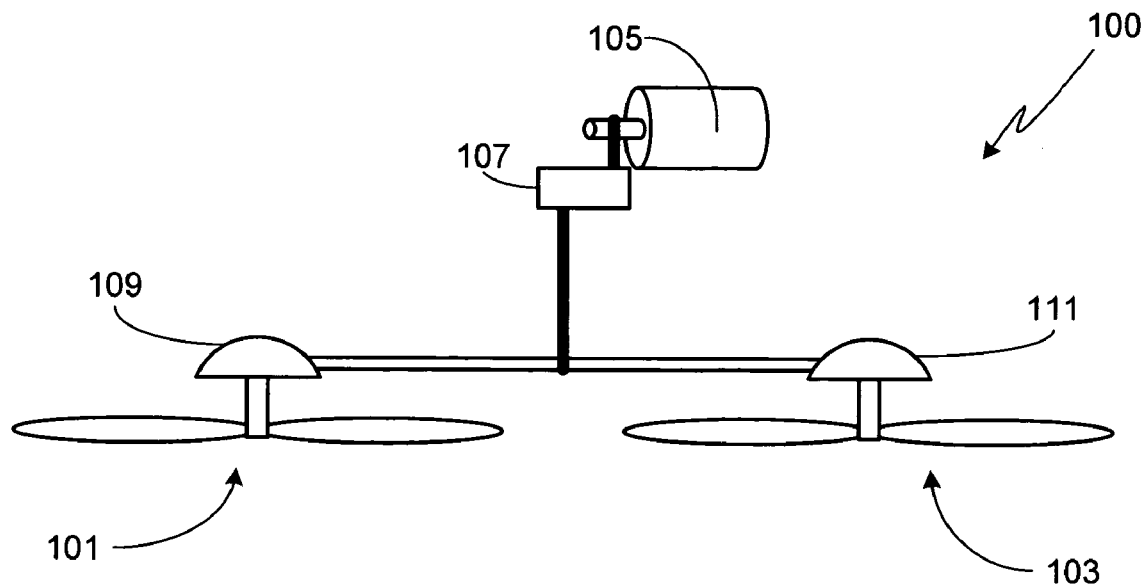
FIG. 1 is an illustration of a dual propeller powered lift platform according to the prior art.

FIG. 1 is a simplified view of a dual propeller powered lift platform according to the prior art. In this figure, as well as those that follow, the required control system is not shown as there are a variety of suitable control systems that are well known by those of skill in the art and which can be used with the prior art platform as well as the invention.

Figure 2:
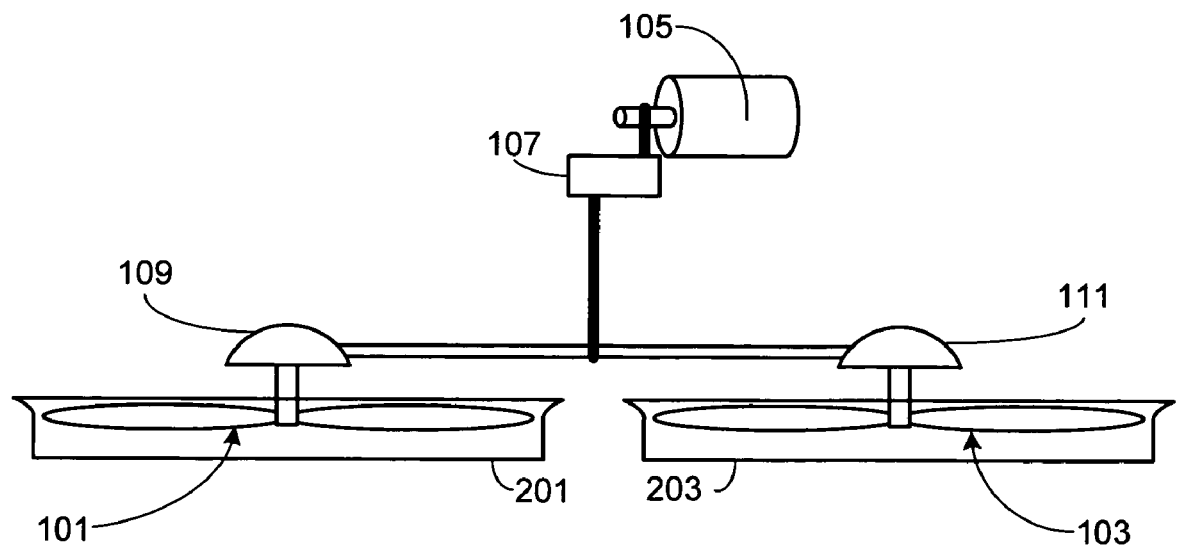
FIG. 2 is an illustration of the platform shown in FIG. 1 in which air ducts surround the propellers.

As shown, platform 100 utilizes a pair of fixed-pitch propellers 101/103 that are counter-rotating to offset yaw effects. Propellers 101/103 are coupled to an engine 105 via a transmission 107 and a pair of gearboxes 109/111 (e.g., ninety degree gearboxes). If desired, propellers 101/103 can be enclosed within a pair of aerodynamic ducts 201/203 as shown in FIG. 2. Ducts 201/203 increase the efficiency of propellers 101/103, thus increasing the lift of the platform for a given propeller diameter and engine power. Additionally, by eliminating the exposed blades of the propellers, the ducts substantially increase the safety of the platform while decreasing the noise generated by the platform. Thrust is controlled by rapidly varying the rotational speed of the propellers.

There are a number of disadvantages associated with the platforms shown in FIGS. 1 and 2. First, failure of engine 105, transmission 107 or gearboxes 109/111 will lead to the catastrophic failure of the platform. Even assuming a low altitude application, on the order of 25–100 feet above ground level, such failure would undoubtedly harm any on-board personnel as well as damage the platform and any platform payloads. Second, due to the use of fixed-pitch propellers, a turbine engine cannot be used in the drive system since the system is incapable of compensating for engine lag. Third, lift platforms of this design are susceptible to upsets due to wind gusts, a problem exacerbated by low altitude applications in which there is limited time for correction prior to ground impact.

Figure 3:
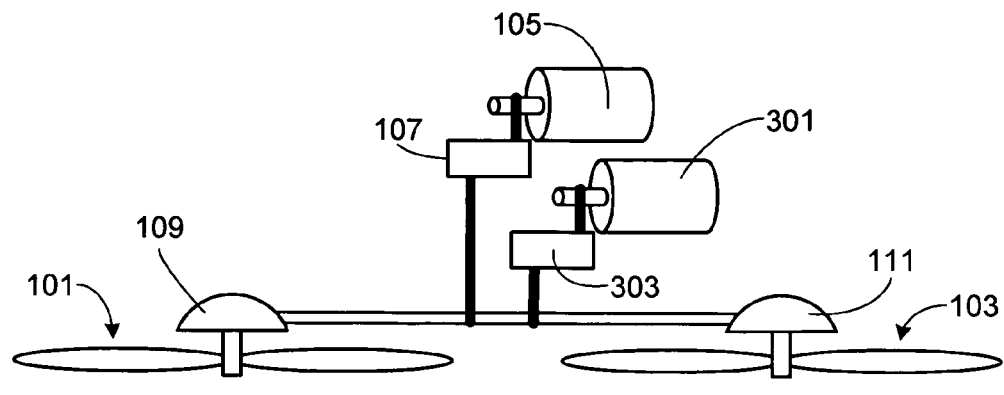
FIG. 3 is an illustration of a dual propeller powered lift platform according to the prior art which includes redundant drive systems.
Figure 4:
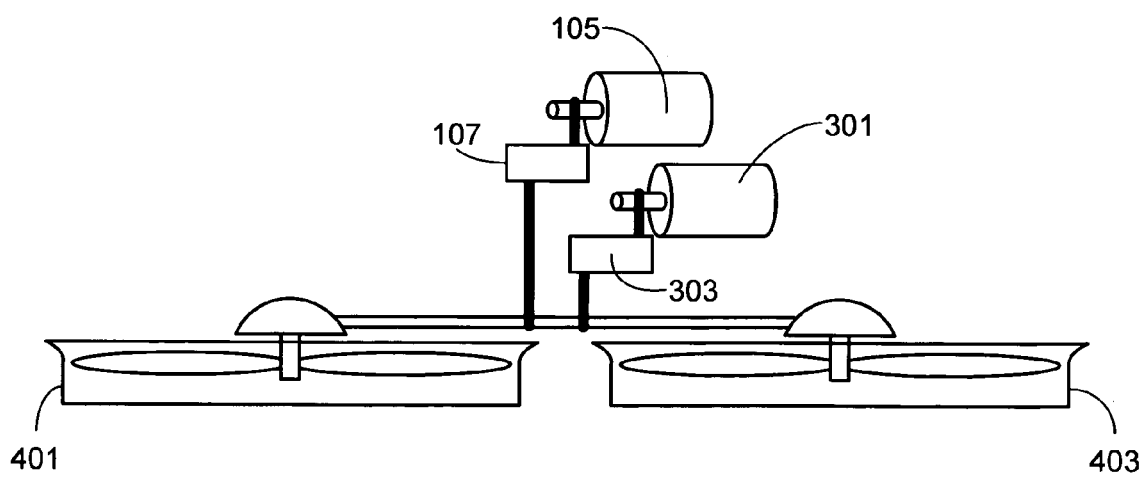
FIG. 4 is an illustration of the platform shown in FIG. 3 in which air ducts surround the propellers.

FIGS. 3 and 4 illustrate one method of achieving fail-safe operation. As shown, in addition to the drive system of FIG. 1, a second, redundant drive system is provided. The redundant system couples a second engine 301 and a second transmission 303 via gearboxes 109/111 to fixed pitch propellers 101/103. If desired, the propellers can be enclosed in ducts, i.e., ducts 401 and 403 as shown in FIG. 4. Although the platforms shown in FIGS. 3 and 4 supply drive system redundancy, and thus a level of fail-safe operation, such redundancy comes at a significant cost in weight due to the second motor and transmission.

Air-Based Thrust Recovery System

FIGS. 5–14 illustrate a variety of embodiments of a thrust recovery system, each of which utilize an on-board air compressor/air storage system. The air compressor/air storage system of the invention provides a secondary power source with minimal additional weight. As described in more detail below, the secondary thrust recovery system can be used to provide fail-safe operation and/or rapid propeller spool-up and/or gust alleviation.

Figure 5:
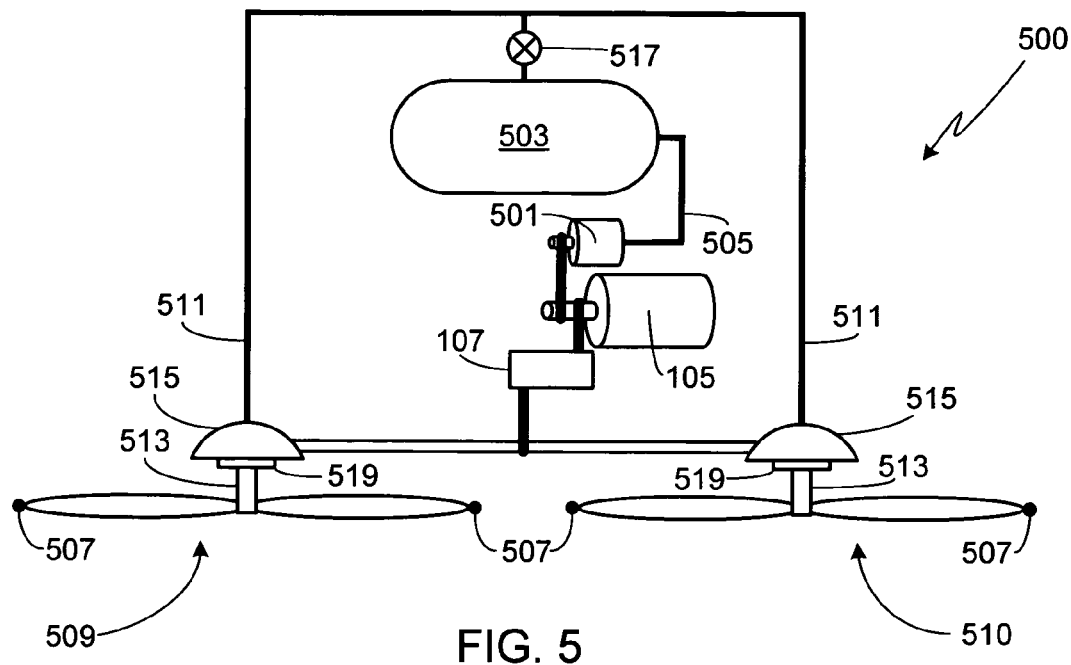
FIG. 5 is an illustration of an embodiment of the invention utilizing propeller tip jets.
Figure 6:
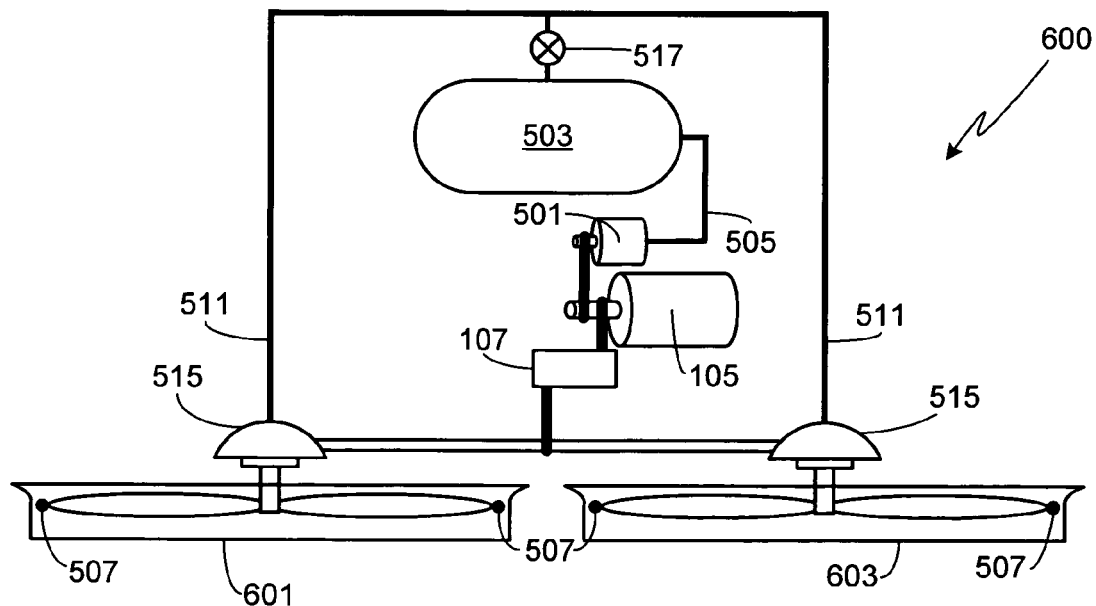
FIG. 6 is an illustration of the platform shown in FIG. 5 in which air ducts surround the propellers.

FIGS. 5 and 6 illustrate an embodiment of the invention which achieves fail-safe operation without the weight penalties required by including a redundant mechanical drive system as previously described. Platform 500 includes a standard fixed-pitch, dual-propeller drive system as previously described. Additionally, engine 105 drives an air compressor 501 which supplies compressed air to air tank 503 via supply line 505. Compressed air from air tank 503 is supplied to cold air jets 507 integrated into the tips of propellers 509/510 via supply lines 511. Preferably supply lines 511 are integrated into propeller drive shafts 513 and ducted through the bodies of the propellers. Valve 517 provides simultaneous control of the jets integrated into both propellers, providing a means of activating jets 507 as well as controlling the amount of air exhausted through the jets. Platform 600 is the same as platform 500 except for the addition of air ducts 601/603.

In use, after a failure in the primary drive system (e.g., engine 105, transmission 107 or gearboxes 515) is detected, the secondary, air jet based system is activated in order to rotate propellers 509/510 using tip jets 507. The rotational velocity of the propellers, and thus the thrust of each propeller, is determined by the amount of air exhausted through the jets which is controlled by valve 517. Although the secondary, air jet based system is capable of providing the same thrust as the engine (i.e., engine 105), due to the limited capacity of compressed air tank 503, this thrust can only be supplied for a short period of time. Thus the air jet based system is designed to safely land the platform from an expected flight altitude on the order of 100 feet above ground. It will be appreciated that as the platform approaches the ground, the overall weight of the platform decreases due to the expenditure of air from tank 503, thus yielding increased control authority during landing.

As shown in FIGS. 5 and 6, the thrust recovery system of the invention also includes an over-running clutch 519 added to each propeller gearbox, thus allowing the propellers to rotate faster than drive shafts 513. There are several benefits to this configuration. First, if there is a failure in the primary drive system, i.e., engine 105, transmission 107 or either gearbox 515, the over-running clutches insure that the secondary drive system, e.g., the air jet system, can continue to rotate the propellers at the desired rotational velocity. Second, this configuration allows a turbine to be used for engine 105 since the air jets are capable of rotating the propellers during engine spool up. As turbine 105 and coupled drive shafts 513 reach parity with the tip jet assisted propellers, the output from the tip jets can be gradually reduced until they are no longer required. Thus the invention allows the platform to utilize higher performance and more reliable turbine engines without using variable pitch propeller blades. It will be appreciated that the invention is not limited to the inclusion of over-running clutches within the gear boxes as shown. For example, an over-running clutch coupled to transmission 107 will provide similar capabilities.

The system shown in FIGS. 5 and 6 not only provides fail-safe operation and the ability to use a turbine engine, it does so with minimal weight penalties. For example, assuming a ducted system in which the ducts are 5 feet in diameter and the overall platform is approximately 6 to 7 feet in width and 12 to 14 feet in length, a a realistic mission weight for such a platform is 750 pounds (e.g., airframe—210 lbs., drive train excluding engine—90 lbs., engine (installed)—140 lbs., air compressor system—40 lbs., air in tank—20 lbs., fuel—50 lbs., and payload—200 lbs.). Utilizing a 100 horsepower 2-stroke aircraft engine, the static thrust for a ducted, dual-propeller platform of the above duct diameter is approximately 820 pounds. Accordingly, during flight the platform has approximately 9% additional thrust available for control authority.

Figure 7:
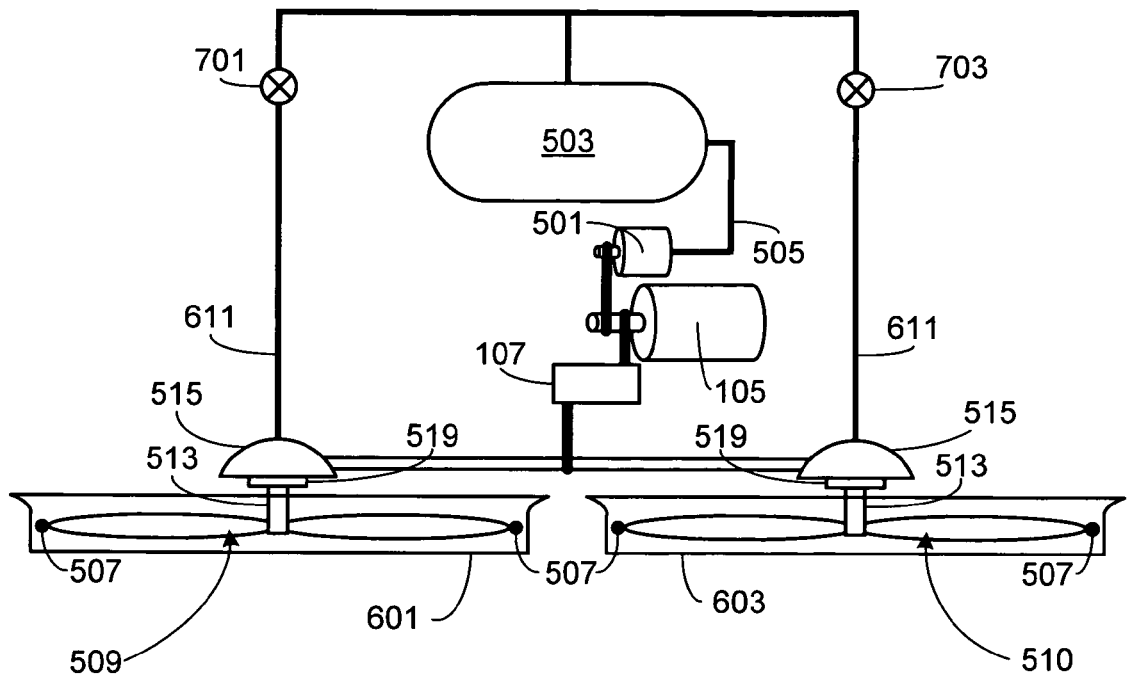
FIG. 7 is an illustration of the platform shown in FIG. 6 which provides single axis attitude control using the propeller mounted tip jets.

FIG. 7 illustrates an alternate preferred embodiment based on the platform shown in FIG. 6. In this embodiment, however, a pair of valves 701/703 couple the compressed air system to the tip jets on propellers 509/510, respectively. Valves 701/703 provide independent control of the amount of air exhausted by the tip jets contained on propellers 509/510, thus providing a simple means of controlling the attitude of the platform in one axis by independently controlling the rotational velocity of the two propellers. Preferably the platform includes air ducts 601/602 as shown.

Figure 8:
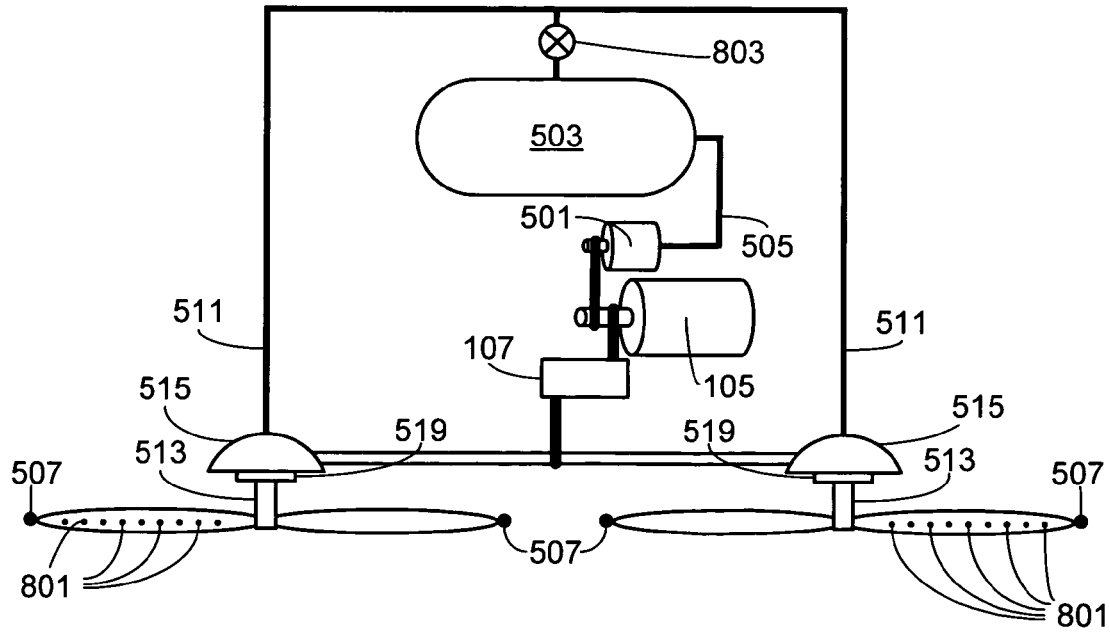
FIG. 8 is an illustration of an embodiment of the invention utilizing a circulation control system embedded within the trailing edge of each propeller blade as well as tip jets.

FIG. 8 illustrates an alternate preferred embodiment utilizing the compressed air secondary system of the invention. In this embodiment, in addition to the tip jets, the compressed air system is coupled to a plurality of small holes 801 located either in the trailing edge or the leading edge of each propeller blade. Preferably holes 801 are approximately 0.020 to 0.30 inches in diameter and are located within the region of 15 to 25 percent axial chord upstream of the trailing edge. Coupling air tank 503 to holes 801 increases the coefficient of lift via circulation control, thereby increasing the level of thrust control. As use of circulation control also increases the coefficient of drag, preferably tip jets 507 are used to compensate for the additional load placed on the drive system. In the embodiment illustrated in FIG. 8, a single valve 803 controls air flow to both propellers as well as both air based systems, i.e., tip jets 507 and circulation control holes 801. The embodiment shown in FIG. 9 is the same as that shown in FIG. 8, except for the addition of ducts 901/903.

Figure 9:
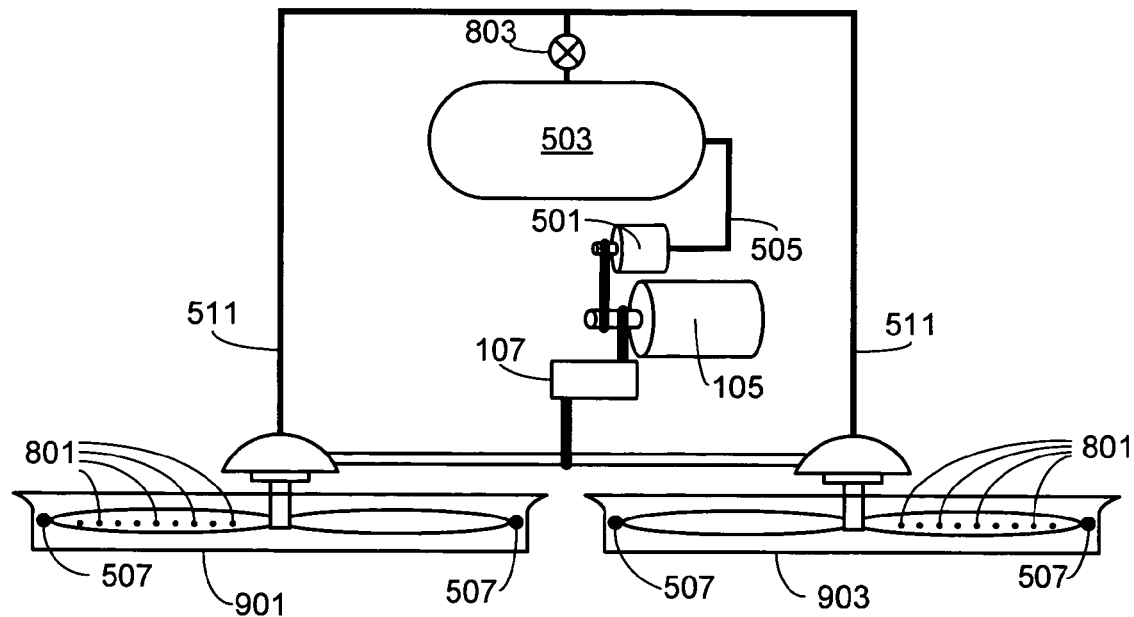
FIG. 9 is an illustration of the platform shown in FIG. 8 in which air ducts surround the propellers.
Figure 10:
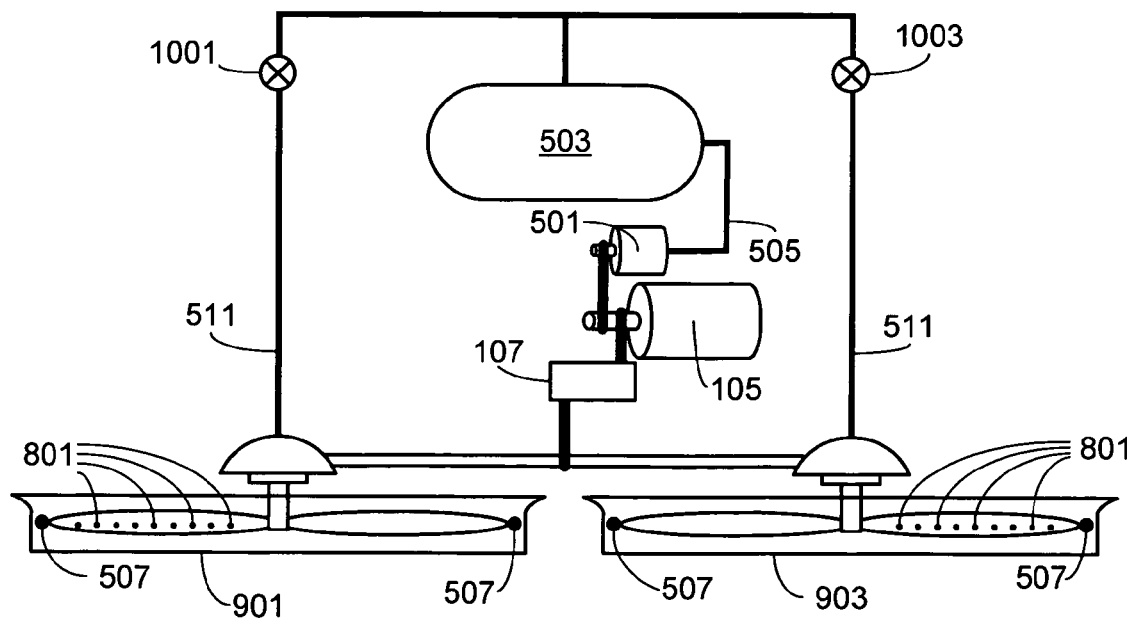
FIG. 10; is an illustration of the platform shown in FIG. 9 which provides independent control of the air-based systems embedded within the two propellers

Although the air systems of both propellers can be operated simultaneously using a single valve as illustrated in FIGS. 8 and 9, dual valves 1001/1003 as shown in FIG. 10 allow independent control of the air flow to each propeller. As a result, and as described relative to FIG. 7, dual valves provide the platform with single axis control. Although the platform of FIG. 10 is ducted, it will be appreciated that ducts 901/903 are not required.

Figure 11:
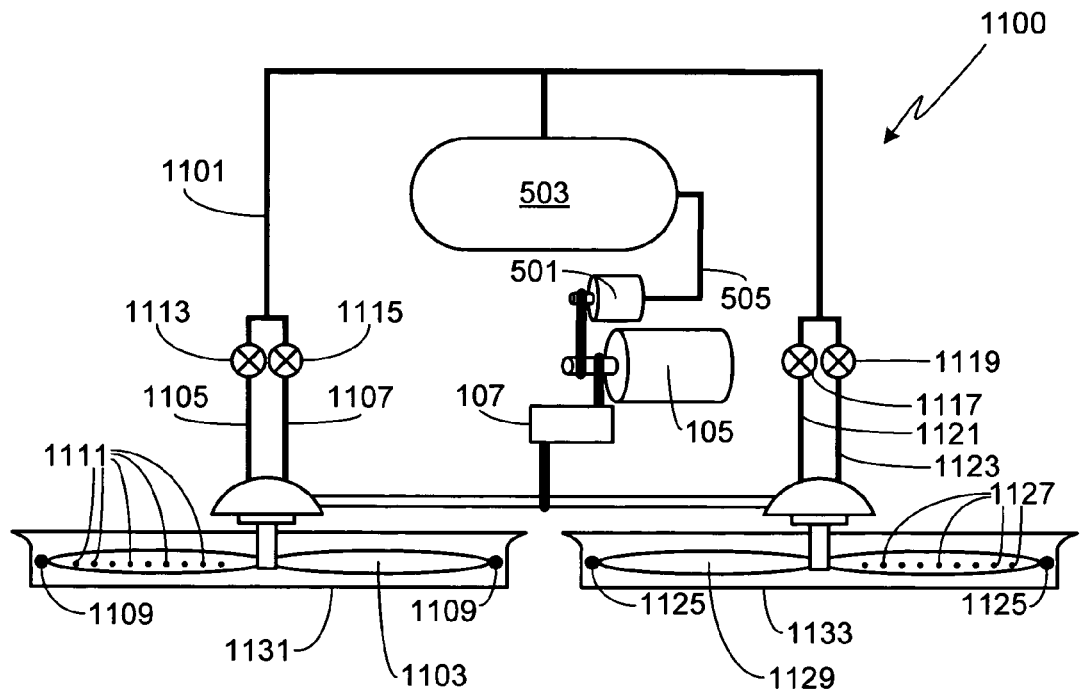
FIG. 11 is an illustration of the platform shown in FIG. 9 which provides independent control over the two thrust recovery systems.

In order to maintain as simple of a mechanical design as possible, preferably the air supply lines contained within the propellers are used both with the tip jets and the circulation control system. If, however, independent control of the two air-based systems is desired, separate supply lines can be used. Although it is possible to use a single valve with the supply lines to the tip jets for both propellers, and a second valve with the supply lines to the circulation system for both propellers, preferably independent control of both air-based systems and both propellers is provided as illustrated in FIG. 11. As shown, air line 1101 to propeller 1103 is split into two lines, 1105 and 1107, the first air line (e.g., line 1105) feeding tip jets 1109 and the second air line (e.g., line 1107) feeding circulatory holes 1111. Separate valves 1113 and 1115 on lines 1105 and 1107, respectively, provide independent control of the two air-based systems for propeller 1103. Similarly, valves 1117/1119 on air lines 1121/1123, respectively, provide independent control of tip jets 1125 and circulatory holes 1127 of propeller 1129. This embodiment provides independent control of the two propellers as well as independent control of the two air-based systems for each propeller. Other variations are clearly envisioned by the inventor, such as (i) four valve systems in which one valve controls total airflow to one propeller, a second valve controls total airflow to the second propeller, and a three-way valve per propeller controls distribution of air flow to the two air-based systems; (ii) three valve systems in which one valve controls air flow to the tip jets on both propellers, a second valve provides circulation control of one propeller and a third valve provides circulation control of the second propeller; and (iii) dual valve systems in which one valve controls air flow to the tip jets on both propellers and the second valve provides circulation control for both propellers.

Preferably system 1100 also includes air ducts 1131/1133 as shown.

Figure 12:
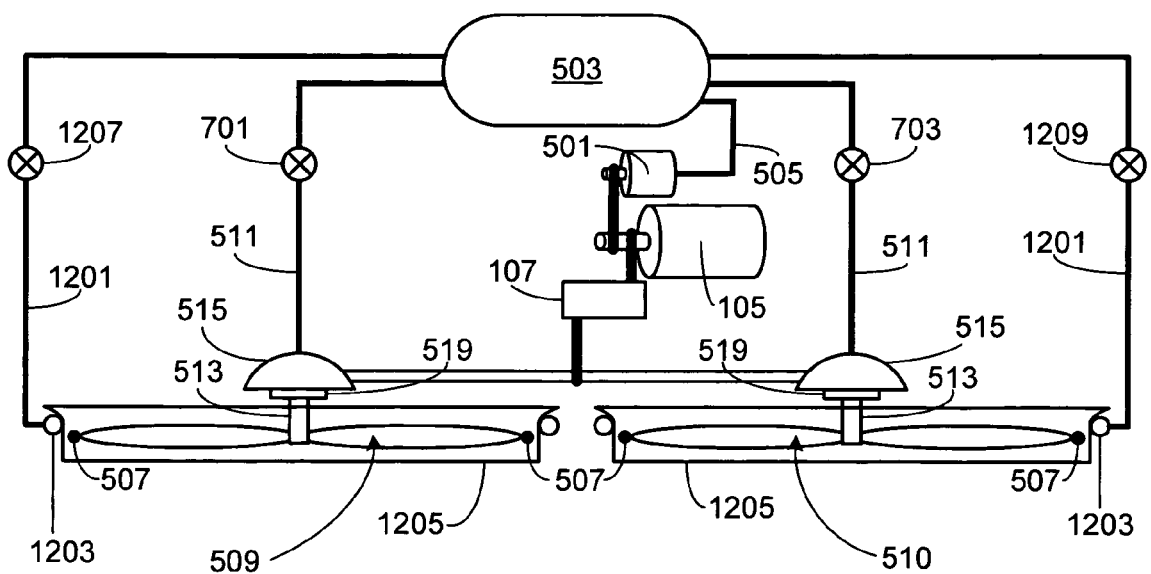
FIG. 12 is an illustration of an embodiment of the invention which includes a gust alleviation system.
Figure 13:
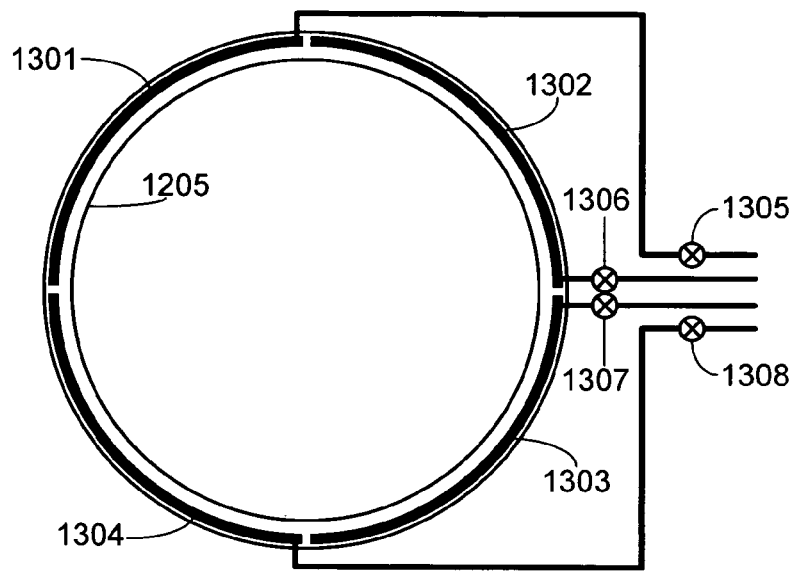
FIG. 13 is a bottom view of one of the ducts shown in FIG. 12.
Figure 14:
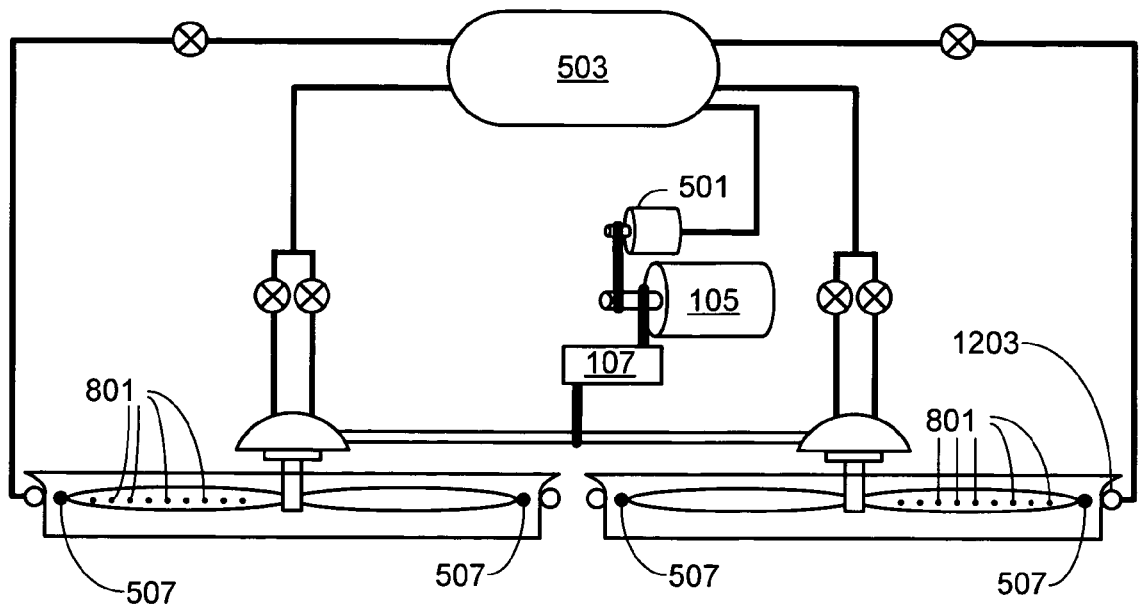
FIG. 14 is an illustration of an embodiment of the invention which includes circulation control systems, propeller tip jets and a gust alleviation system.

In addition to using the air-based system of the invention to provide system redundancy and control via tip jets and circulation control, the air-based system can also be used to provide gust alleviation in any embodiment using air ducts (e.g., FIGS. 6, 7 and 9–11). More specifically, by selectively blowing air from air tank 503 over selected duct segments, the effects of wind gusts can be reduced. FIG. 12 illustrates one such system based on the tip jet system shown in FIG. 7. As shown, air from air tank 503 not only feeds tip jets 507 via lines 511, but also feeds air through line 1201 into perforated tubing 1203 located around the periphery of air ducts 1205. At least two valves 1207/1209 are used to control which air duct tubing is coupled to tank 503, as well as the amount of air to be emitted through the tubing's perforations. Preferably the perforated tubing surrounding each duct is divided into segments, for example four segments, the amount of air flowing through each segment under the control of an independent valve. FIG. 13 provides a bottom view of one of the ducts 1205. As shown, the perforated air duct tubing is divided into four segments, 1301–1304, each coupled to air line 1201 via independent valves 1305–1308, respectively. It will be appreciated that each air duct tubing surrounding the individual ducts can be divided into fewer, or greater, numbers of segments, depending upon the desired level of control. It will also be understood that the gust alleviation system, i.e., the perforated tubing surrounding the air ducts, can not only be used with the tip jets as illustrated, but also with the combination of the tip jets and the circulatory control system (e.g., FIG. 14).

It will be appreciated that the figures are meant to illustrate the primary elements of the invention and that variations are clearly envisioned by the inventor. For example, the air compressor can either be a stand-alone device as shown, or integrated within the engine. Accordingly, the disclosures and descriptions herein are intended to be illustrative, but not limiting, of the scope of the invention which is set forth in the following claims.

What is claimed is:

1. A lift platform comprising:
   a primary drive system, comprising:
      an engine;
      a transmission coupled to said engine;
      a first fixed-pitch propeller coupled to said transmission;
      a first over-running clutch interposed between said transmission and said first fixed-pitch propeller;
      a second fixed-pitch propeller coupled to said transmission; and
      a second over-running clutch interposed between said transmission and said second fixed-pitch propeller; and
   an auxiliary drive system, comprising:
      an air compressor coupled to said engine;
      an air storage tank coupled to said air compressor;
      a thrust recovery system coupled to said air storage tank, said thrust recovery system further comprising a first plurality of tip jets positioned at a first plurality of propeller tips corresponding to said first fixed-pitch propeller and a second plurality of tip jets positioned at a second plurality of propeller tips corresponding to said second fixed-pitch propeller; and
      at least one valve for controlling air flow from said air storage tank to said thrust recovery system.

2. The lift platform of claim 1, wherein said first and second over-running clutches are combined into a single clutch unit.

3. The lift platform of claim 1, wherein said at least one valve comprises a single valve controlling air flow to both said first and second pluralities of tip jets.

4. The lift platform of claim 1, wherein said at least one valve comprises a first valve controlling air flow to said first plurality of tip jets and a second valve controlling air flow to said second plurality of tip jets.

5. The lift platform of claim 1, further comprising a first air duct surrounding said first fixed-pitch propeller and a second air duct surrounding said second fixed-pitch propeller.

6. The lift platform of claim 1, wherein said engine is a turbine engine.

7. The lift platform of claim 1, wherein said thrust recovery system further comprises a first plurality of holes positioned within each trailing edge of each propeller blade of said first fixed-pitch propeller and a second plurality of holes positioned within each trailing edge of each propeller blade of said second fixed-pitch propeller.

8. The lift platform of claim 7, wherein said first and second pluralities of holes are between 0.020 and 0.30 inches in diameter.

9. The lift platform of claim 7, wherein said first and second pluralities of holes are positioned within a region of 15 to 25 percent axial chord upstream of each trailing edge.

10. The lift platform of claim 7, wherein said at least one valve comprises a single valve controlling air flow to said first and second pluralities of holes and to said first and second pluralities of tip jets.

11. The lift platform of claim 7, wherein said at least one valve comprises a first valve controlling air flow to said first plurality of holes and to said first plurality of tip jets, and a second valve controlling air flow to said second plurality of holes and to said second plurality of tip jets.

12. The lift platform of claim 7, wherein said at least one valve comprises a first valve controlling air flow to both said first and second pluralities of tip jets and a second valve controlling air flow to both said first and second pluralities of holes.

13. The lift platform of claim 7, wherein said at least one valve comprises a first valve controlling air flow to said first plurality of tip jets, a second valve controlling air flow to said second plurality of tip jets, a third valve controlling air flow to said first plurality of holes and a fourth valve controlling air flow to said second plurality of holes.

14. The lift platform of claim 7, further comprising a first air duct surrounding said first fixed-pitch propeller and a second air duct surrounding said second fixed-pitch propeller.

15. The lift platform of claim 7, wherein said engine is a turbine engine.

16. The lift platform of claim 1, wherein said thrust recovery system further comprises a first plurality of holes positioned within each leading edge of each propeller blade of said first fixed-pitch propeller and a second plurality of holes positioned within each leading edge of each propeller blade of said second fixed-pitch propeller.

17. The lift platform of claim 1, further comprising:
a first air duct surrounding said first fixed-pitch propeller;
a second air duct surrounding said second fixed-pitch propeller; and
wherein said thrust recovery system further comprises means for selectively blowing air over said first air duct and means for selectively blowing air over said second air duct.

18. The lift platform of claim 17, wherein said means for selectively blowing air over said first air duct comprises a first perforated tubing encircling at least a portion of said first air duct, and wherein said means for selectively blowing air over said second air duct comprises a second perforated tubing encircling at least a portion of said second air duct.

19. The lift platform of claim 17, wherein said means for selectively blowing air over said first air duct comprises a first perforated tubing encircling at least a portion of said first air duct, and wherein said means for selectively blowing air over said second air duct comprises a second perforated tubing encircling at least a portion of said second air duct, and wherein said thrust recovery system further comprises
a first plurality of holes positioned within each trailing edge of each propeller blade of said first fixed-pitch propeller and a second plurality of holes positioned within each trailing edge of each propeller blade of said second fixed-pitch propeller.

20. A lift platform comprising:
a primary drive system, comprising:
an engine;
a transmission coupled to said engine;
a first fixed-pitch propeller coupled to said transmission;
a first over-running clutch interposed between said transmission and said first fixed-pitch propeller;
a second fixed-pitch propeller coupled to said transmission; and
a second over-running clutch interposed between said transmission and said second fixed-pitch propeller; and
an auxiliary drive system, comprising:
an air compressor coupled to said engine;
an air storage tank coupled to said air compressor;
a thrust recovery system coupled to said air storage tank;
at least one valve for controlling air flow from said air storage tank to said thrust recovery system;
a first air duct surrounding said first fixed-pitch propeller;
a second air duct surrounding said second fixed-pitch propeller; and
wherein said thrust recovery system further comprises a first perforated tubing encircling at least a portion of said first air duct for selectively blowing air over said first air duct and a second perforated tubing encircling at least a portion of said second air duct for selectively blowing air over said second air duct.

21. A lift platform comprising:
a primary drive system, comprising:
an engine;
a transmission coupled to said engine;
a first fixed-pitch propeller coupled to said transmission;
a first over-running clutch interposed between said transmission and said first fixed-pitch propeller;
a second fixed-pitch propeller coupled to said transmission; and
a second over-running clutch interposed between said transmission and said second fixed-pitch propeller; and
an auxiliary drive system, comprising:
an air compressor coupled to said engine;
an air storage tank coupled to said air compressor;
a thrust recovery system coupled to said air storage tank;
multiple valves for controlling air flow from said air storage tank to said thrust recovery system;
a first air duct surrounding said first fixed-pitch propeller;
a second air duct surrounding said second fixed-pitch propeller; and
wherein said thrust recovery system further comprises a first multi-segmented perforated tubing encircling at least a portion of said first air duct for selectively blowing air over said first air duct and a second multi-segmented perforated tubing encircling at least a portion of said second air duct for selectively blowing air over said second air duct; and
wherein said multiple valves control air flow to each segment of said first multi-segmented perforated tubing and each segment of said second multi-segmented perforated tubing.

* * * * *